United States Patent
Aleman

(10) Patent No.: US 10,518,707 B2
(45) Date of Patent: *Dec. 31, 2019

(54) SLIDABLE STEP FOR MOUNTING AND DISMOUNTING A VEHICLE

(71) Applicant: United Rentals, Inc., Stamford, CT (US)

(72) Inventor: Silverio Aleman, Watsonville, CA (US)

(73) Assignee: UNITED RENTALS, INC., Stamford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 16/430,378

(22) Filed: Jun. 3, 2019

(65) Prior Publication Data

US 2019/0283677 A1 Sep. 19, 2019

Related U.S. Application Data

(63) Continuation of application No. 15/512,750, filed as application No. PCT/US2015/033575 on Jun. 1, 2015, now Pat. No. 10,351,065.

(51) Int. Cl.
*B60R 3/02* (2006.01)
*B60N 3/02* (2006.01)
*B60R 3/00* (2006.01)

(52) U.S. Cl.
CPC ............. *B60R 3/02* (2013.01); *B60N 3/026* (2013.01); *B60R 3/007* (2013.01)

(58) Field of Classification Search
CPC .. B60R 3/02; B60R 3/00; B60R 3/002; B60R 3/007; B60N 3/026
See application file for complete search history.

(56) References Cited

U.S. PATENT DOCUMENTS

| 2,373,083 A | * | 4/1945 | Brewster | F16B 21/165 411/348 |
| 3,008,533 A | * | 11/1961 | Haberle | B60R 3/02 182/88 |
| 3,330,577 A | * | 7/1967 | Mills | B60R 3/007 182/88 |
| 3,756,622 A | * | 9/1973 | Pyle | B60R 3/02 280/166 |

(Continued)

OTHER PUBLICATIONS

DECKMATE ladder; pp. 1-2 retrieved from www.deckmateladder. com on Dec. 14, 2018; p. 3: screenshot of YOUTUBE video of ladder retrieved from https://www.youtube.com/watch?v=aSdDodnIfWs &feature=youtu.be entitled "Deckmate.mov" (Year: 2002) (Year: 2010).*

(Continued)

*Primary Examiner* — James A Shriver, II
*Assistant Examiner* — Steve Clemmons
(74) *Attorney, Agent, or Firm* — K&L Gates LLP

(57) ABSTRACT

An assembly for mounting or dismounting a vehicle comprising a step that is structured to slide on an axis longitudinally along the vehicle on a rail. The step has a pivot assembly enabling rotation from a stowed position to open position and back. The slidable step can be stowed in place by engaging a latch mounted to the vehicle. A handrail assembly can be inserted into a handrail-receiving member to facilitate grasping a handrail upon mounting or dismounting the vehicle.

7 Claims, 9 Drawing Sheets

(56) References Cited

U.S. PATENT DOCUMENTS

| | | | | |
|---|---|---|---|---|
| 4,021,071 A * | 5/1977 | Norman | | B60R 3/02 296/62 |
| 4,159,122 A * | 6/1979 | Stevens | | B60R 3/02 108/134 |
| 4,194,754 A * | 3/1980 | Hightower | | B60R 3/02 280/166 |
| 4,911,264 A * | 3/1990 | McCafferty | | B25H 5/00 182/150 |
| 5,280,934 A * | 1/1994 | Monte | | B60R 3/02 182/127 |
| 5,456,479 A * | 10/1995 | Conger | | B60R 3/007 280/165 |
| 5,799,961 A * | 9/1998 | Schmeets | | E06C 5/00 182/92 |
| 6,082,751 A * | 7/2000 | Hanes | | B60R 3/02 280/163 |
| 6,394,307 B1 * | 5/2002 | Andrews | | B60P 3/36 221/186 |
| 7,992,681 B2 * | 8/2011 | Anderson | | B60R 3/007 182/106 |
| 8,104,577 B1 * | 1/2012 | Reed | | E06C 5/32 182/127 |
| 9,677,334 B2 * | 6/2017 | Aiken | | E06C 5/04 |
| 10,351,065 B2 * | 7/2019 | Aleman | | B60R 3/007 280/164.1 |
| 2001/0005478 A1 * | 6/2001 | Lewis | | A61G 3/061 414/537 |
| 2005/0173191 A1 * | 8/2005 | Linzmayer | | B60R 3/007 182/127 |
| 2009/0267385 A1 * | 10/2009 | Shackleford | | B60R 3/007 296/193.05 |
| 2010/0019468 A1 * | 1/2010 | Price | | B60R 3/007 280/165 |
| 2012/0104718 A1 * | 5/2012 | Alvarez | | B60R 3/00 280/163 |

OTHER PUBLICATIONS

Search Report and Written Opinion dated Aug. 12, 2015 issued for International PCT Application No. PCT/US15/33575 (Year: 2015).*
International Preliminary Report on Patentability dated May 9, 2016 issed for International PCT Application No. PCT/US15/33575 (Year: 2016).*

* cited by examiner

SLIDABLE STEP FOR MOUNTING AND DISMOUNTING A VEHICLE

PRIORITY CLAIM AND CROSS-REFERENCE TO RELATED APPLICATIONS

This application is a continuation application filed under 35 U.S.C. § 120 of U.S. patent application Ser. No. 15/512,750, titled SLIDABLE STEP FOR MOUNTING AND DISMOUNTING A VEHICLE, filed Mar. 20, 2017, which application is a U.S. National Stage Entry filed under 35 U.S.C. § 371 of International Patent Application No. PCT/US2015/033575, titled SLIDABLE STEP FOR MOUNTING AND DISMOUNTING A VEHICLE, filed Jun. 1, 2015, the entire disclosures of which are hereby incorporated by reference herein.

BACKGROUND

Flatbed vehicles have many virtues. They can haul heavy and/or oversized goods, such as heavy equipment and machines. In addition, they can haul many smaller items. Further, loading a flatbed is not impeded by the closed sides of a truck design with a rear door.

However, the very virtues of a flatbed can present challenges. For example, when it comes to loading, heavy and/or oversized cargo may be relatively more difficult to secure to the truck, and pose awkward positioning challenges. The same applies where there are many smaller items, which must be restrained from movement. In addition, once goods arrive at their destination they must be unloaded from the flatbed. Doing so can be complicated, arduous, and time-consuming for the staff tasked with unloading.

There is value in giving trained personnel maximum access and flexibility to handle and control goods on a vehicle requiring significant loading or unloading. This includes giving individuals enhanced ease in mounting and dismounting the vehicle, which can be many feet off the ground. The greater the access of personnel, the greater the efficiency, performance and safety of hauling goods.

DETAILED DESCRIPTION

Figure 1:
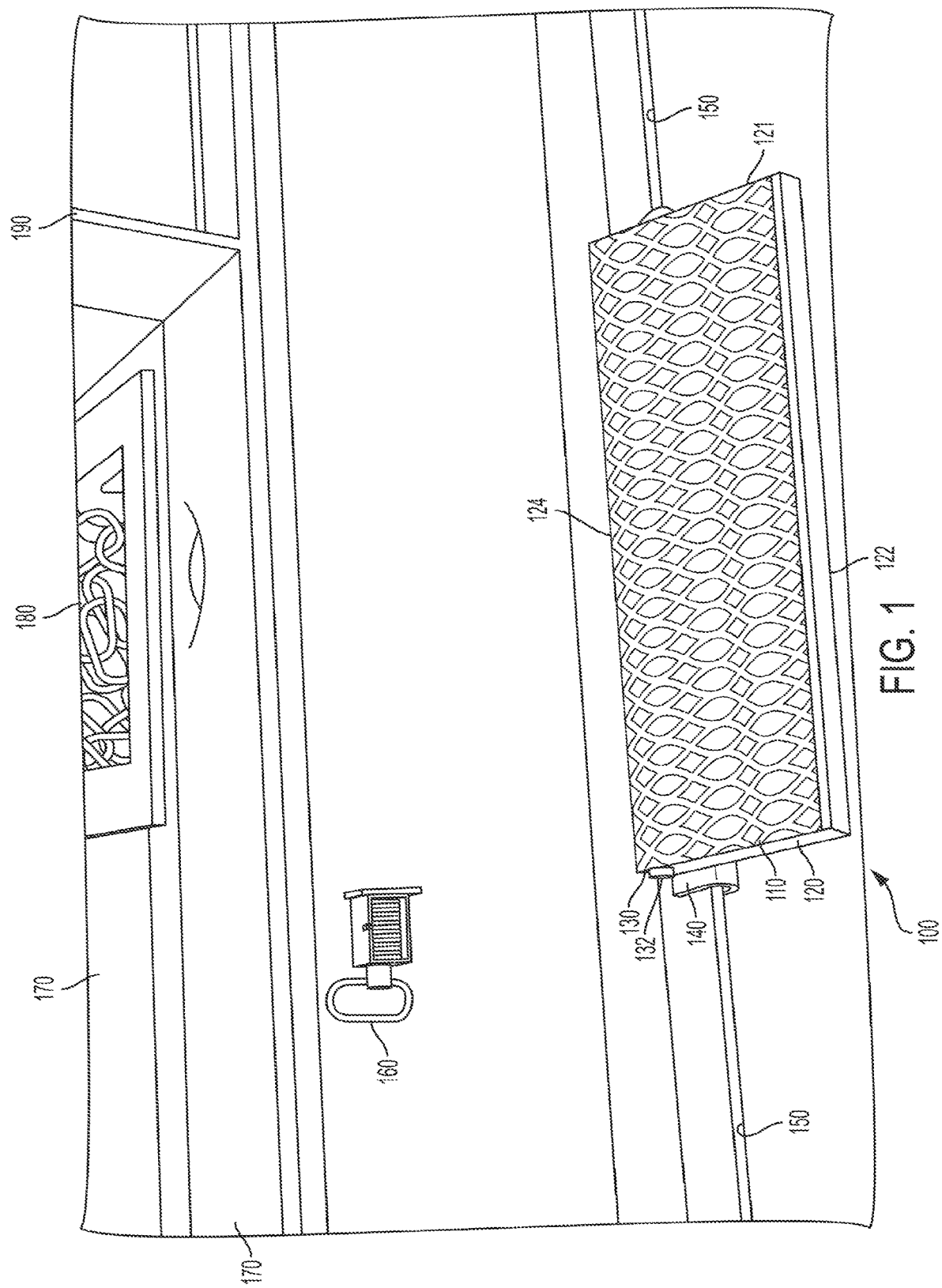
FIG. 1 illustrates one embodiment of a step assembly in an open position.

FIG. 1 illustrates one embodiment of a step assembly 100 in an open position. Step assembly 100 has a tread 110 on which one can place a foot. In FIG. 1, the top of tread 110 is seen because step assembly 100 is in an open position. Tread 110 can assist in weight-bearing of an individual placing a foot on the step. Tread 110 can have traction-providing properties depending on the type of tread. Shown is a perforated tread with diamond-shaped features, but it will be appreciated that numerous varieties of tread can be employed.

An endplate can be employed to engage one, multiple or all edges of tread 110. There can be multiple endplates, such as along a tread width portion on the left side (endplate 120) and right side (endplate 121) of tread 110. The endplates 120, 121 can run along axes of tread width. In addition, endplates 122, 124 can be provided along axes of tread length. Endplate 122 can represent a near endplate of tread 110. It can also, if so structured, comprise a nosing. Endplate 124 can represent a far endplate of tread 110. An endplate can assist with structural integrity yet various forms can be used, and can be optional under certain circumstances. Thus, the location of a portion of a tread can be designated by a location, e.g., tread left width positioned substantially at endplate 120, tread right width positioned substantially at endplate 121, tread near length 122 positioned substantially at endplate 122, and tread far length 124 positioned substantially at endplate 124. Each of these locations can have a full endplate, a partial or minimal endplate, or no endplate. Thus, the location of a portion of a tread can also be designated by a location such as left width, right width, near length, or far length. It will be appreciated that in embodiments the left width can be straight, or in other embodiments it can be another shape; accordingly, a tread 110 that is curved, or in embodiments even circular, can be used, with accompanying shapes defining its periphery. Thus, herein a left width is understood to mean that portion of the tread that is at the left, whether it is straight, curved, or a combination of both. The foregoing applies to a right width, near length, or far length; in other words, the location of the tread can be defined in relation to its orientation.

Figure 2:
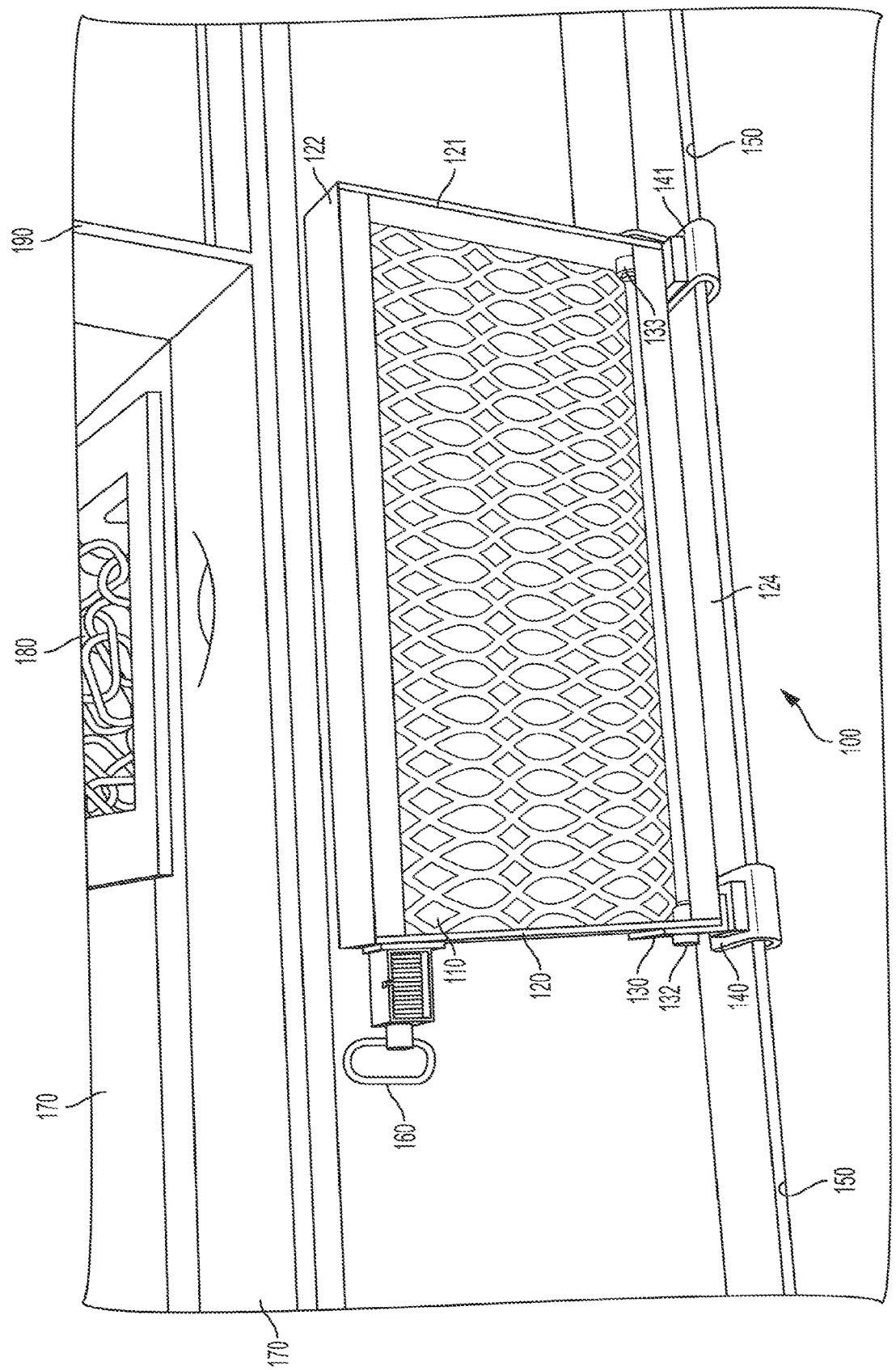
FIG. 2 illustrates one embodiment of a step assembly in a stowed position.

Step assembly 100 can assume an open position as in FIG. 1, or assume a stowed position as in FIG. 2. Left bracket member 130 can be a structure that engages left rail-engaging member 140. Left bracket member 130 can help enable step assembly 100 to swing by virtue of left pivot assembly 132. Left pivot assembly 132 can include a rod about which tread 110 can rotate wherein the rod is held in place by a structure(s), such structure(s) engaging on the one hand left bracket member 130 and on the other hand tread 110 or endplate 120. Added types of pivot-assembly structures can be used. Left rail-engaging member 140, which can be secured to left bracket member 130, engages rail 150 that runs along the side of the vehicle. A rail 150 can be on one or both sides of the vehicle, formed integrally with, or fastened to, the vehicle.

It will be appreciated that, in embodiments, along a right width 121 there can be right-side counterpart structures to left-side structures 120, 130, 132, and 140, which will be discussed later.

Step assembly 100 can be positioned in engagement with rail 150 such that step assembly 100 can be used by an individual to mount or dismount the vehicle, enabling easier access to and from the flatbed portion 170 of the vehicle. Thus, an individual can use step assembly 100 to gain access to the flatbed portion 170, and, for example, use securing devices such as chains 180 to secure goods on the vehicle. In this manner, loading and unloading the vehicle can be accomplished in a more efficient fashion.

Also shown is latch member 160, mounted to the vehicle, which can assist with holding step assembly 100 in place in a stowed position. Further shown is a frame member 190 that can represent a vertical portion between the cabin portion of the vehicle and the flatbed portion 170. Step assembly 100 can be positioned to engage with latch member 160 to stow step assembly 100. Latch member 160 can comprise one of numerous suitable types of latches, as will be appreciated. Further, it will be appreciated that step assembly 100 can be structured in multiple ways to engage latch member 160, depending on nature of latch member 160 used.

FIG. 2 illustrates one embodiment of a step assembly 100 in a stowed position. In FIG. 2, the bottom of tread 110 is seen because step assembly 100 is in a closed position. Step assembly 100 is secured to the vehicle by a latch member 160, inhibiting step assembly 100 from moving both laterally along rail 150, and also rotationally towards an open position. In other words, in stowed position, step assembly 100 is essentially fixed alongside the vehicle. In the stowed position, step assembly 100 does not extend lateral to the vehicle. A latch can be secured to the vehicle in multiple locations so that it can engage step assembly 100.

Figure 3:
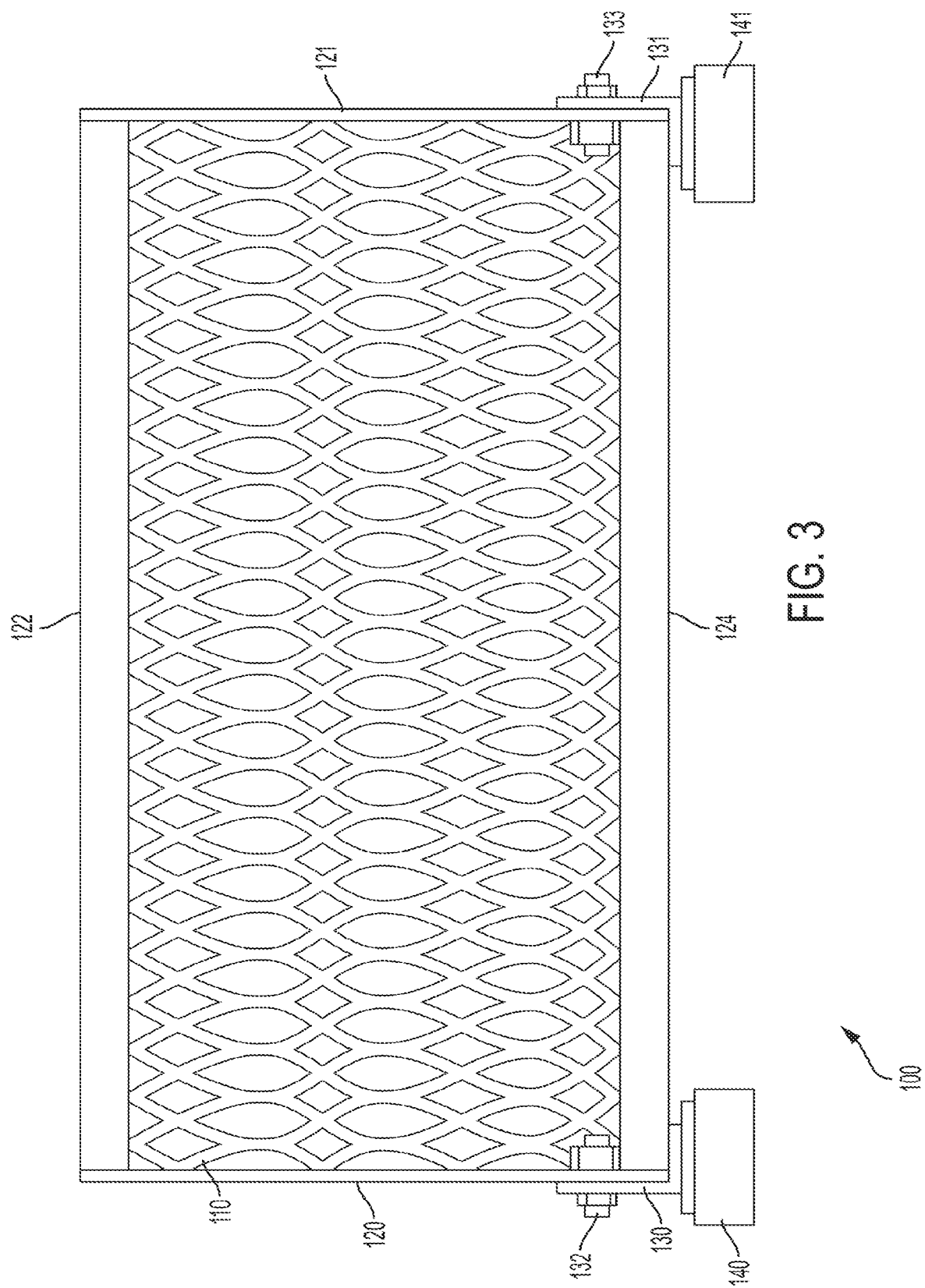
FIG. 3 illustrates one embodiment of a step assembly, as viewed from below.

FIG. 3 is another view of one embodiment of a step assembly 100 in a stowed position. The bottom of tread 110 is seen. Left bracket member 130 can be secured to left rail-engaging member 140, and right bracket member 131 can be secured to right rail-engaging member 141. It will be appreciated that there are numerous ways for bracket members 130, 131 to be secured to respective rail-engaging members 140, 141. In added embodiments, left bracket member 130 and left rail-engaging member 140 are integrally formed, representing one member, and the same for right bracket member 131 and right rail-engaging member 141. Left pivot assembly 132 can extend through a left endplate 120 of tread 110 through openings in left bracket member 130, which can enable rotation of the step assembly. An identical or similar right pivot assembly 133 can extend through right endplate 121 of tread 110. Left pivot assembly 132 can engage left endplate 120 and be located near the rear of the tread, i.e., toward the far length 124 such that when step assembly 100 is lowered into an open position it can be supported by a structure holding it essentially stable such as rail-engaging member 140, or rail 150, or both, or another mechanism. Thus, an individual can step onto or off of step assembly 100. Right-side counterpart structures can perform similar functions.

Figure 4:
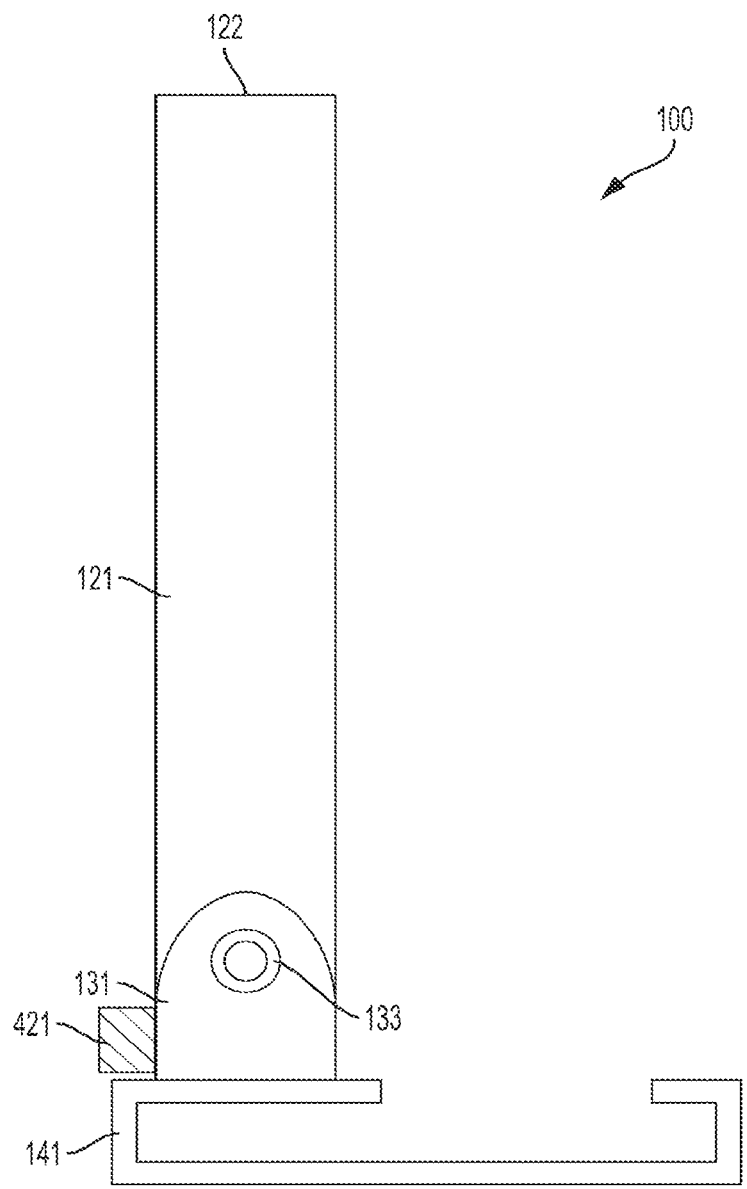
FIG. 4 illustrates an embodiment of a step assembly in a stowed position, as viewed from the right side.

FIG. 4 is a view of a step assembly 100 in a stowed position, as viewed from the right side. Illustrated are right endplate 121 covering a right width of tread 110 (not shown). Also illustrated are right bracket member 131, right pivot assembly 133, and right rail-engaging member 141. Additionally, step assembly 100 can have right wedge material 421 that enables additional stability, such as for tread portion 110 to rest on rail-engaging members 140, 141 or another structure and so to stabilize tread 110 for being stepped upon.

Figure 5:
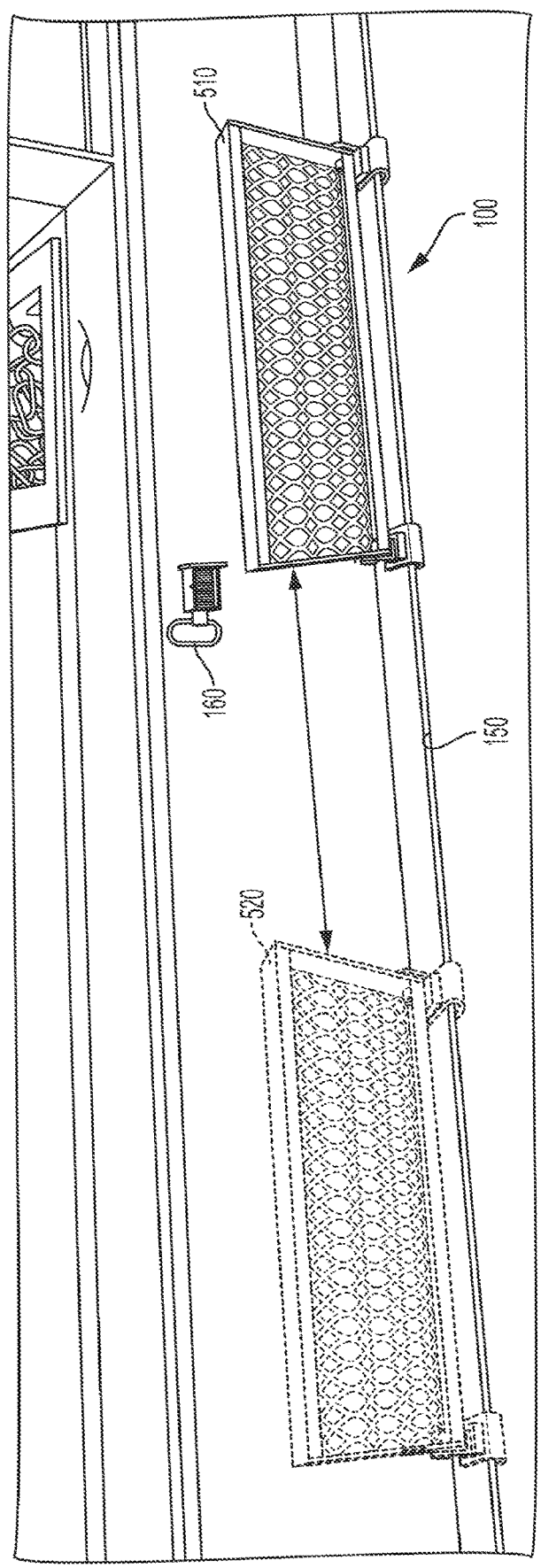
FIG. 5 illustrates an example embodiment showing a step assembly slidably advancing along a rail.

FIG. 5 illustrates an example embodiment whereby step assembly 100 can be slidably advanced along rail 150. Once unlatched from latch member 160, step assembly 100 is free to slide on an axis longitudinally along the vehicle along rail 150. Step assembly 100 is also able to rotate from a stowed position to an open position and back. Having advanced slide assembly 100 from a first position 510 longitudinally toward the back of the vehicle, the step, in its second position 520, can be fully lowered. Once lowered into an open position, an individual can use the step to mount or dismount the vehicle. As desired, the step can be slid back from a second position 520 to a first position 510, onto any position along rail 150. Upon reaching the first position, the slide may be, if desired, securedly engaged to latch member 160.

Figure 6:
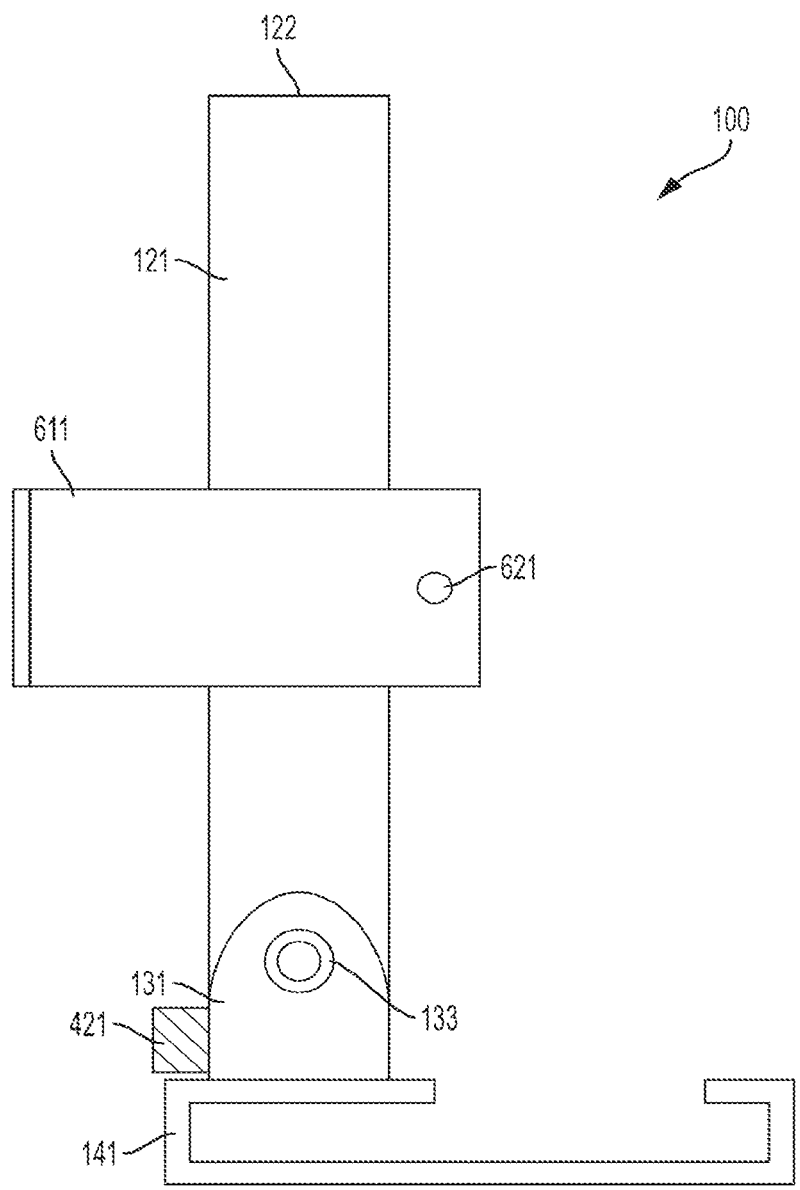
FIG. 6 illustrates an example embodiment showing a pipe sleeve, as viewed from the right.

FIG. 6 illustrates an example embodiment where, in a right-side view, a right handrail-receiving member 611 is secured to step assembly 100 to receive a right lower portion of a handrail assembly (not shown). Right handrail-receiving member 611 can comprise a pipe-sleeve or other structure. Right ball lock pin 621 can be deployed to engage in a secure manner with a handrail assembly. In embodiments, right ball lock pin 621 can be positioned in an additional location on right handrail-receiving member 611. In an embodiment, there is a right handrail-receiving member 611 and a left-handrail receiving member 610 (not shown). However, in embodiments there can be one such member, or three or more.

Figure 7:
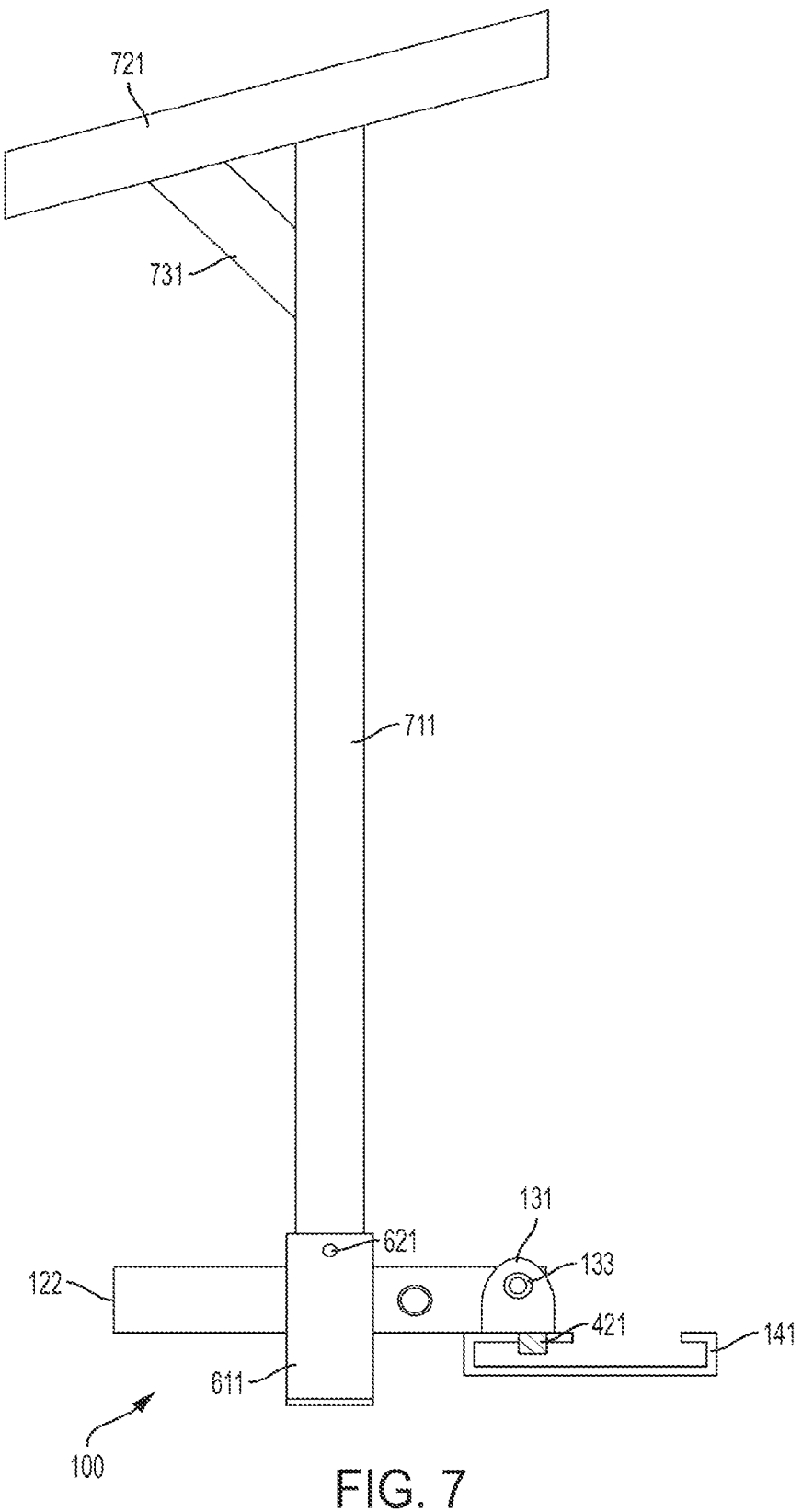
FIG. 7 illustrates an example embodiment of a handrail assembly engaged with a step assembly, as viewed from the right.

FIG. 7 illustrates an example embodiment of a handrail assembly engaged with a step assembly, as viewed from the right. Step assembly 100 is in an open position, and thus handrail-receiving member 611 can receive a right handrail post 711. Right handrail-receiving member 611 can securedly engage right handrail post 711 by virtue of a ball lock pin 621. At the upper portion of right handrail post 711 can be secured a handrail 721, the position of which is reinforced by handrail support 731; this assembly can engage a left handrail post (not shown). In this manner, an individual can step onto step assembly 100 and stabilize himself or herself by embracing handrail 721 in mounting or dismounting the vehicle. Right handrail post 711, handrail 721, and handrail support 731 can be formed from an ASTM A53 steel stock, or some or all of the components hereof can be formed from a suitably rigid material; a counterpart handrail post on the left side can be similarly constructed. Right handrail post 711, right handrail 721, and right handrail support 731 can comprise a hand-rail assembly; in addition, a left handrail post can be used in combination therewith.

Accordingly, once step assembly 100 is advanced to a desired location along the rail, and lowered into an open position, a handrail assembly can be inserted into handrail-receiving member 611.

Figure 8:
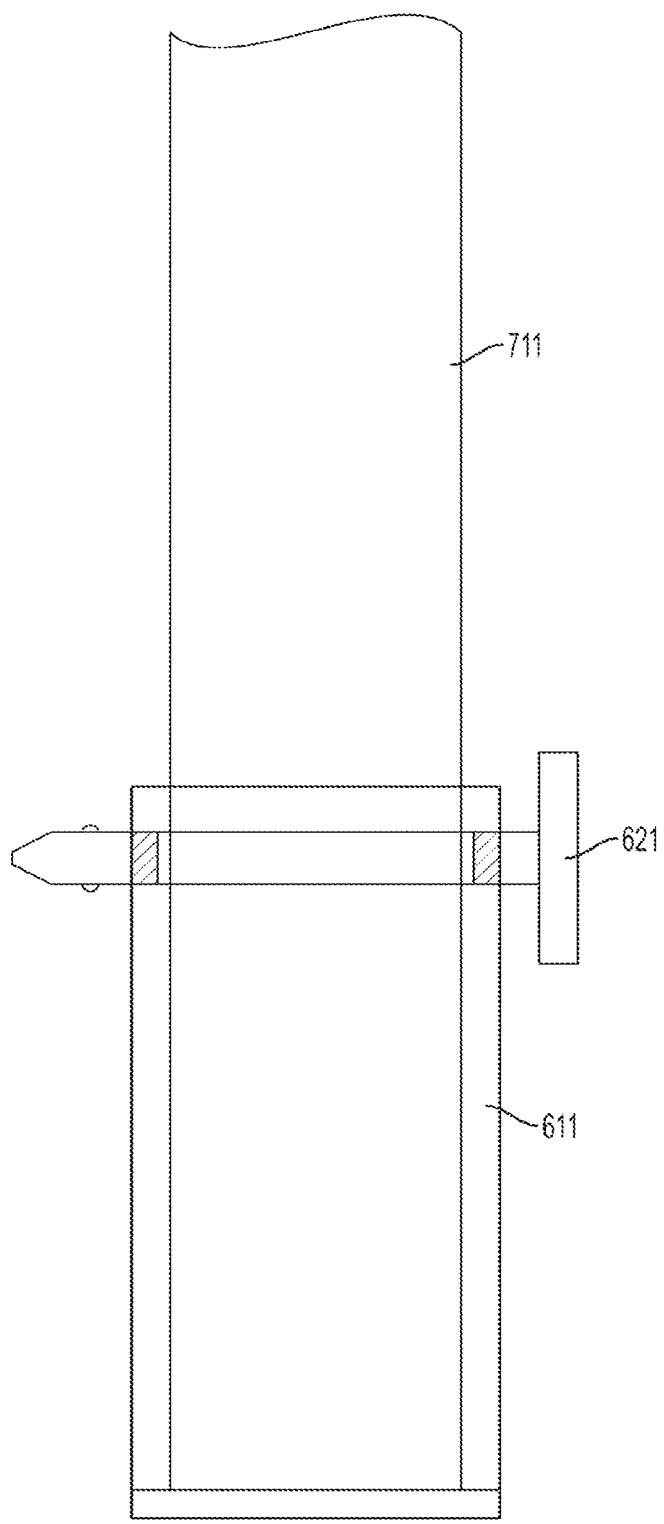
FIG. 8 illustrates an example embodiment of a handrail-receiving member.

FIG. 8 illustrates an example embodiment of a mechanism for engaging a right handrail post 711 with a right handrail-receiving member 611. In an embodiment herein, right handrail post 711 can be inserted into right handrail-receiving member 611. The two structures can be securedly engaged by right ball lock pin 621. Upon receiving right handrail post 711, right handrail-receiving member 611 can secure right handrail post 711, whereupon an individual can use handrail 721 in mounting or dismounting from the vehicle.

Figure 9:
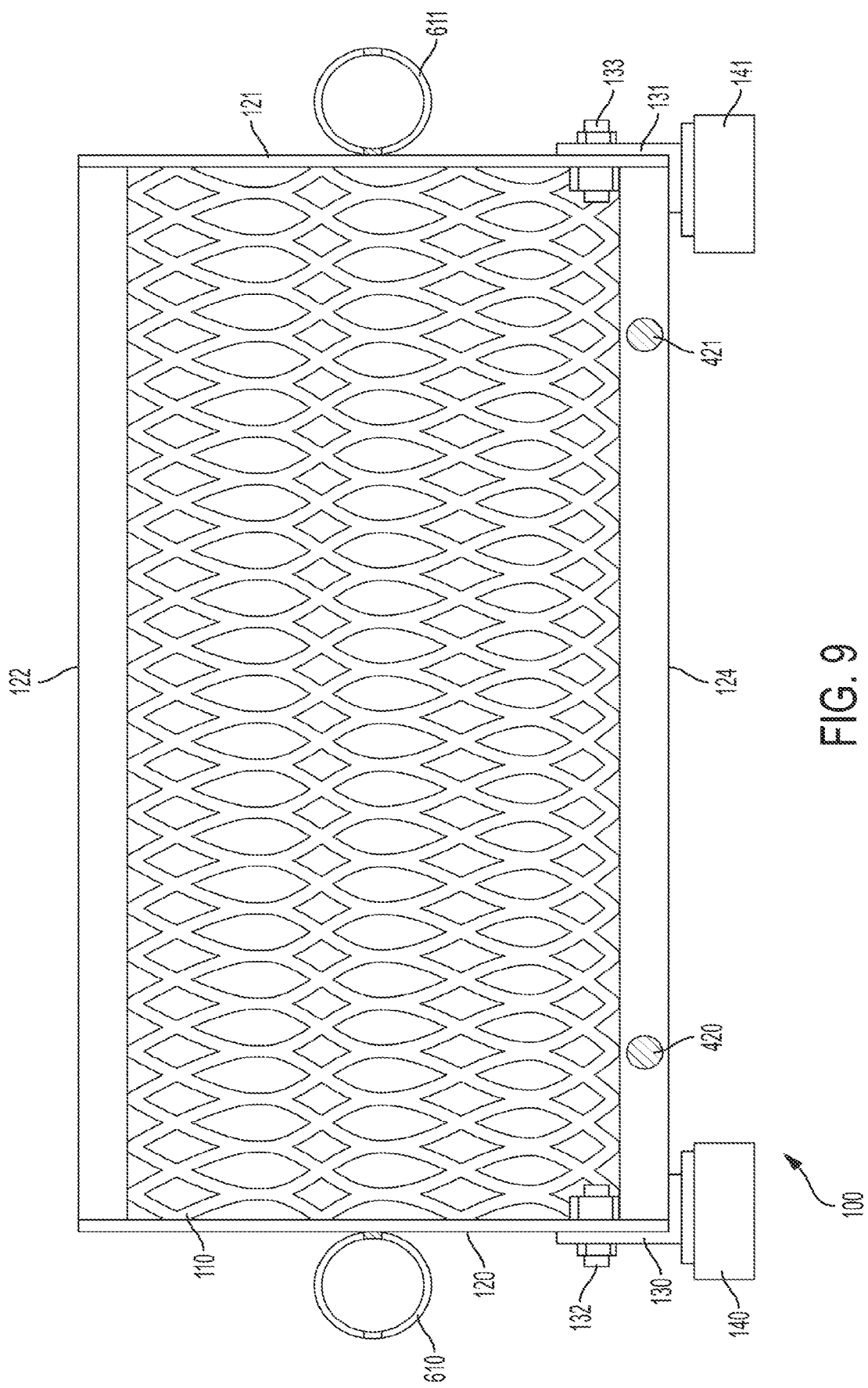
FIG. 9 illustrates an example embodiment of a step assembly with handrail-receiving members, as viewed from below.

FIG. 9 illustrates an example embodiment of a step assembly with left handrail-receiving member 610 and right handrail-receiving member 611, as viewed from below. The step assembly is depicted as in a stowed position. Once it is opened, it will be able to receive left handrail post 710 (not shown) and right handrail post 711 (as in FIG. 7).

In the description hereof, reference is made to the accompanying drawings which illustrate several embodiments of the present invention. It is understood that other embodiments may be utilized, and mechanical, compositional, structural, and other operational changes may be made without departing from the spirit and scope of the present disclosure. The accompanying detailed description is not to be taken in a limiting sense, and the scope of the embodiments of the present invention is defined only by the claims of the issued patent.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, those skilled in the art will appreciate that the structures for securing described herein (e.g., forming the junctions) may be replaced or supplemented by other suitable securing means including a variety of other types of mechanical securing devices (e.g., nails, rivets, or others). In another example, a particular choice of construction material (e.g., steel, polymer, etc.) may be replaced or supplemented by another type of material which is suitable for the same or similar structure or function.

It will be appreciated that, for convenience and clarity of disclosure, terms describing relative orientation or spatial positioning such as "vertical," "horizontal," "up," "down," "top," "front," "back," or "bottom," may be used at times herein with respect to the drawings and text description in association with various embodiments of the invention. However, such terms are primarily used for illustrative purposes and are not necessarily intended to be limiting in nature.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a more detailed discussion of such elements is not provided herein. It should be appreciated that the figures are presented for illustrative purposes and not as construction drawings. Omitted details and modifications or alternative embodiments are within the purview of persons of ordinary skill in the art. For example, there may be variations to these diagrams or the operations described herein without departing from the spirit of the invention.

It can be appreciated that, in certain aspects of the present invention, a single component may be replaced by multiple components, and multiple components may be replaced by a single component, to provide an element or structure or to perform a given function or functions. In addition, components engaging each other can be separate components, or integrally formed. Except where such substitution or replaceability would not be operative to practice certain embodiments of the present invention, such substitution or replaceability is considered within the scope of the present invention.

While the invention has been described in terms of particular embodiments and illustrative figures, those of ordinary skill in the art will recognize that the invention is not limited to the embodiments or figures described.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A step assembly for mounting or dismounting a vehicle, comprising:
   a tread having a left width portion, a right width portion, a near length portion, and a far length portion;
   a left bracket member engaging the left width portion, the left bracket member further engaging a left pivot assembly;
   a right bracket member engaging the right width portion, the right bracket member further engaging a right pivot assembly;
   the left bracket member secured to a left rail-engaging member, the left rail-engaging member structured so as to enable slidable movement longitudinally along the vehicle of the step assembly along a rail, wherein the left bracket member and left rail-engaging member are in a fixed, non-rotatable relationship with each other;
   the right bracket member secured to a right rail-engaging member, the right rail-engaging member structured so as to enable slidable movement longitudinally along the vehicle of the step assembly along a rail, wherein the right bracket member and right rail-engaging member are in a fixed, non-rotatable relationship with each other; and
   at least one handrail-receiving member secured to the left width portion or right width portion for securedly engaging a handrail assembly, wherein the left pivot assembly and right pivot assembly enable the tread portion to rotate along an axis substantially proximal to the far length portion of the tread, and wherein the at least one handrail-receiving member is structured to secure a handrail post.

2. The step assembly of claim 1, wherein the at least one handrail-receiving member is structured to engage with a ball lock pin insertable into a recess through the at least one handrail-receiving member.

3. The step assembly of claim 1, further comprising a handrail post structured to engage with a ball lock pin insertable into a recess through the handrail post.

4. The step assembly of claim 3 wherein the handrail is reinforced by a handrail support.

5. The step assembly of claim 4, wherein the handrail is located on the handrail post distal to the tread, after the handrail post is inserted into the handrail-receiving member.

6. The step assembly of claim 1, wherein the at least one handrail-receiving member is structured to engage with a ball lock pin insertable into a first recess through the at least one handrail-receiving member, further comprising a handrail post structured to engage with a ball lock pin insertable into a second recess through the handrail post, and further comprising a ball lock pin insertable through the two recesses once the handrail post is inserted into the at least one handrail receiving member and the two recesses are aligned thereby.

7. The step assembly of claim 6, wherein the ball lock pin secures in place the handrail post to the at least one handrail-receiving member.

* * * * *